(12) United States Patent
Mei et al.

(10) Patent No.: US 9,865,882 B2
(45) Date of Patent: Jan. 9, 2018

(54) NOBLE METAL CATALYST LAYER, MEMBRANE ELECTRODE ASSEMBLY, AND METHOD FOR PRODUCING NOBLE METAL CATALYST LAYER

(71) Applicant: KABUSHIKI KAISHA TOSHIBA, Minato-ku, Tokyo (JP)

(72) Inventors: Wu Mei, Yokohama (JP); Shigeru Matake, Yokohama (JP); Taishi Fukazawa, Tokyo (JP); Yoshihiro Akasaka, Kawasaki (JP); Katsuyuki Naito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 800 days.

(21) Appl. No.: 13/850,478

(22) Filed: Mar. 26, 2013

(65) Prior Publication Data

US 2013/0252132 A1  Sep. 26, 2013

(30) Foreign Application Priority Data

Mar. 26, 2012 (JP) .................. 2012-069647
Nov. 20, 2012 (JP) .................. 2012-254747

(51) Int. Cl.
| | |
|---|---|
| *H01M 4/86* | (2006.01) |
| *H01M 4/88* | (2006.01) |
| *H01M 4/92* | (2006.01) |
| *H01M 8/10* | (2016.01) |
| *H01M 8/1018* | (2016.01) |

(52) U.S. Cl.
CPC ........ *H01M 4/8657* (2013.01); *H01M 4/861* (2013.01); *H01M 4/8871* (2013.01); *H01M 4/92* (2013.01); *H01M 8/10* (2013.01); *H01M 2008/1095* (2013.01)

(58) Field of Classification Search
CPC .................................................. H01M 4/861
See application file for complete search history.

(56) References Cited

U.S. PATENT DOCUMENTS

| | | | | |
|---|---|---|---|---|
| 6,482,763 | B2 | 11/2002 | Haugen et al. | |
| 2002/0177031 | A1* | 11/2002 | Doshi | H01M 8/0226 |
| | | | | 429/514 |
| 2003/0190518 | A1* | 10/2003 | Karuppaiah | H01M 4/8605 |
| | | | | 429/480 |
| 2006/0204832 | A1* | 9/2006 | Mei | H01M 4/8605 |
| | | | | 429/483 |
| 2007/0122684 | A1* | 5/2007 | Song | H01M 4/861 |
| | | | | 429/483 |
| 2008/0166623 | A1* | 7/2008 | Cendak | B01J 23/892 |
| | | | | 429/524 |

(Continued)

*Primary Examiner* — Maria Laios
*Assistant Examiner* — Robert S Carrico
(74) *Attorney, Agent, or Firm* — Finnegan, Henderson, Farabow, Garrett & Dunner, L.L.P.

(57) ABSTRACT

According to one embodiment, the noble metal catalyst layer includes first noble metal layer and a second noble metal layer formed on the first noble metal layer. The first noble metal layer includes a first noble metal element and has a porosity of 65 to 95 vol. %, a volume of pores having a diameter of 5 to 80 nm accounts for 50% or more of a volume of total pores in the first noble metal layer. The second noble metal layer includes a second noble metal element, and has an average thickness of 3 to 20 nm and a porosity of 50 vol. % or less.

18 Claims, 2 Drawing Sheets

(56) References Cited

U.S. PATENT DOCUMENTS

2009/0148739 A1\* 6/2009 Akasaka ............. H01M 8/0234
　　　　　　　　　　　　　　　　　　　　　　　　　429/410
2010/0021787 A1\* 1/2010 Wu ....................... C23C 14/205
　　　　　　　　　　　　　　　　　　　　　　　　　429/535
2010/0167164 A1\* 7/2010 Reilly ................. H01M 4/9033
　　　　　　　　　　　　　　　　　　　　　　　　　429/485
2011/0177424 A1\* 7/2011 Goto .................... H01M 4/861
　　　　　　　　　　　　　　　　　　　　　　　　　429/481

\* cited by examiner

NOBLE METAL CATALYST LAYER, MEMBRANE ELECTRODE ASSEMBLY, AND METHOD FOR PRODUCING NOBLE METAL CATALYST LAYER

CROSS-REFERENCE TO RELATED APPLICATIONS

This application is based upon and claims the benefit of priority from Japanese Patent Applications No. 2012-069647, filed Mar. 26, 2012; and No. 2012-254747, filed Nov. 20, 2012, the entire contents of all of which are incorporated herein by reference.

FIELD

Embodiments described herein relate generally to a noble metal catalyst layer, a membrane electrode assembly, and a method for producing a noble metal catalyst layer.

BACKGROUND

Recently, electrochemical cells have been actively studied. Among the electrochemical cells, for example, a fuel cell is a system in which a fuel such as hydrogen is electrochemically reacted with an oxidant such as oxygen to generate electric power. Among them, a polymer electrolyte membrane fuel cell (PEFC) can operate at low temperatures as compared with other fuel cells and its reaction product is water, thereby reducing an environmental load. Hence this cell has been supplied to practical use as a household stationary power source, and further as an automotive power source. For the full-scale spread of PEFC, it is necessary to greatly reduce the amount of a noble metal catalyst contained in the catalyst layer of each electrode.

Generally, a carbon-supported catalyst in which a noble metal catalyst material is supported by a carbon black support is used for a catalyst layer of PEFC. When the carbon-supported catalyst is used as the automotive power source, the carbon support contained in the catalyst layer is corroded by the start and stop operation. Further, the catalyst itself supported by the carbon support is dissolved. It has been reported that this accelerates deterioration of the catalyst layer and a membrane electrode assembly (MEA) containing the catalyst layer. Development of a noble metal catalyst layer having high durability and a high reaction area is essential to greatly reduce the amount of the noble metal catalyst. A catalyst layer formed by sputtering or vapor-depositing the catalyst material is carbonless. Accordingly, deterioration due to corrosion of a catalyst support can be avoided.

In order to achieve a high reaction area, there has been suggested a method comprising: forming a catalyst layer precursor containing a porogen (pore-forming material) and a noble metal catalyst material by sputtering or vapor-depositing; and removing the porogen to produce a catalyst layer containing pores. However, the reaction area of the noble metal catalyst is not still sufficient. If a large amount of the porogen is introduced into the catalyst layer to increase the porosity, many large cavities with a size of more than 100 nm appear in the catalyst layer. This causes deterioration of fuel cell performance.

DETAILED DESCRIPTION

In general, according to one embodiment, the noble metal catalyst layer includes first noble metal layer and a second noble metal layer formed on the first noble metal layer. The first noble metal layer includes a first noble metal element and has a porosity of 65 to 95 vol. %, a volume of pores having a diameter of 5 to 80 nm accounts for 50% or more of a volume of total pores. The second noble metal layer includes a second noble metal element, and has an average thickness of 3 to 20 nm and a porosity of 50 vol. % or less.

Hereinafter, embodiments will be described in detail with reference to the drawings.

Figure 1:
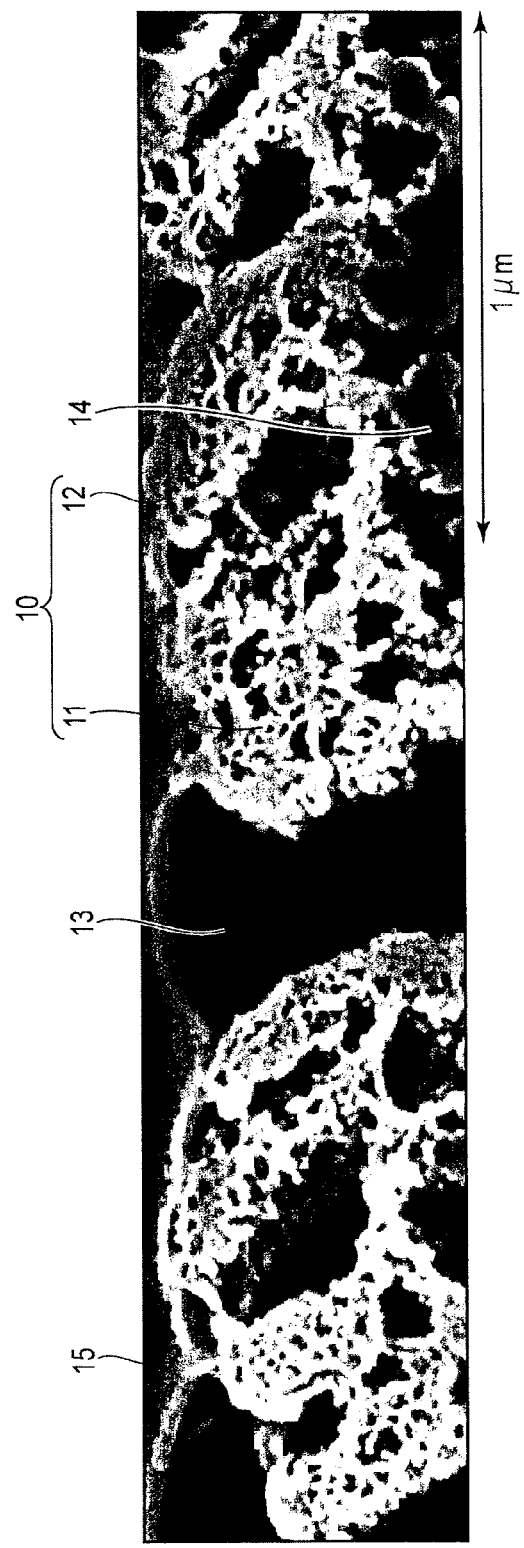
FIG. 1 is a view showing an image obtained by observing a part of a catalyst layer according to a one embodiment with a Scanning Electron Microscope.

FIG. 1 is a view showing an image obtained by observing a catalyst layer according to one embodiment with a scanning electron microscope (SEM). The magnification is 100,000 times.

A noble metal catalyst layer 10 includes a first noble metal layer 11 and a second noble metal layer 12 formed on the first noble metal layer 11. In FIG. 1, a cavity 13 is present in the first noble metal layer 11, a substrate 14 is formed on one surface of the noble metal catalyst layer 10, and an electrolyte membrane 15 is formed on the other surface of the noble metal catalyst layer 10. As the substrate 14, a carbon sheet, a Teflon sheet ("Teflon" is a trademark of Du Pont) or the like is used. In FIG. 1, the second noble metal layer 12 is also formed on the side of the substrate 14 of the first noble metal layer 11. The first noble metal layer 11 is preferably formed on the opposite side surface of the substrate 14 of the noble metal catalyst layer 10.

The first noble metal layer 11 is a porous layer having a porosity of 65 to 95 vol. %. In the first noble metal layer, the volume of pores having a diameter of 5 to 80 nm accounts for 50% or more of the volume of its total pores. The pore state in the first noble metal layer 11 is thus specified so that a high catalytic activity can be obtained.

When the porosity of the first noble metal layer 11 is too low, the utilization efficiency of the noble metal catalyst is low. In order to obtain a sufficient utilization efficiency, it is necessary to increase the amount of the noble metal catalyst. When the porosity is too high, it becomes difficult to form a porous structure uniformly in the first noble metal layer. As a result, performance of an electrochemical cell using a noble metal catalyst layer is deteriorated. Thus, in this embodiment, the porosity of the first noble metal layer 11 is set to a range of 65 to 95 vol. %. The porosity of the first noble metal layer is preferably from 75 to 95 vol. %, more preferably from 80 to 95 vol. %.

As shown in FIG. 1, the cavity 13 having a diameter of 100 nm or more is present in the first noble metal layer 11. In the first noble metal layer 11, the pore distribution except the cavity 13 having a diameter of 100 nm or more satisfies specific conditions. Specifically, in the first noble metal layer 11, the volume of pores having a diameter of 5 to 80 nm is 50 vol. % or more of a volume of total pores in the first noble metal layer.

In this embodiment, the large pore having a diameter of 100 nm or more is defined as a cavity. If the pore diameter is too small, the mass transfer associated with the electrode reaction becomes insufficient. On the other hand, if the pore diameter is too great, a uniform supply of a fuel into the surface of the noble metal catalyst which generates an electrode reaction or a uniform discharge of products is not realized. Accordingly, attention is focused on pores having a diameter of 5 to 80 nm.

If the volume of the pores having a diameter of 5 to 80 nm is too low, the performance of the electrochemical cell becomes lower. Further, it is considered that a smooth supply of an electrode reactant such as a fuel or a smooth discharge of electrode reaction products is not realized and thus the reaction area of the noble metal catalyst is reduced. Thus, the volume of pores having a diameter of 5 to 80 nm is specified to be 50 vol. % or more. The volume of pores having a diameter of 5 to 80 nm in the first noble metal layer 11 is preferably 70 vol. % or more.

For example, in the case of an automotive fuel battery, low-temperature starting (about −40° C.) is required. It is reported that the low-temperature starting strongly depends on the size of water present in pores of the catalyst layer, and pores having a size of several nm in the catalyst layer are important, particularly for the low-temperature starting. The pore distribution in the first noble metal layer of this embodiment is considered to be effective for the low-temperature starting of the fuel cell.

As for the pore distribution in the first noble metal layer 11, the volume of pores having a diameter of 30 nm or more is preferably 30 vol. % or more of a volume of its total pores. The pore distribution used herein is a value excluding the cavity 13 having a diameter of 100 nm or more. When the pore distribution is in the above range and the layer is used as a fuel cell cathode, water generated by power generation can be stored in the first noble metal layer 11. As a result, it is considered that the robustness of the fuel cell is improved and an effect for preventing deterioration of the electrolyte membrane is given. Thus, the volume of pores having a diameter of 30 nm or more is preferably 30 vol. % of a volume of its total pores. The volume of pores having a diameter of 30 nm or more is preferably 40 vol. % or more, more preferably 50 vol. % or more.

The second noble metal layer 12 has a porosity of 50 vol. % or less and an average thickness of 3 to 20 nm. In this regard, the second noble metal layer may have a porosity of 0 vol. %. The second noble metal layer 12 is set to the conditions so that a noble metal catalyst layer having a high specific surface area and a high use efficiency can be obtained. Further, the first noble metal layer 11 having a predetermined porosity can be uniformly formed at the time of producing the noble metal catalyst layer 10 to be described later. Therefore, it is possible to prevent a decrease in the performance of an electrochemical cell using the metal catalyst layer 10 to be obtained.

The second noble metal layer having a low porosity of 50 vol. % or less is present, and thus a porous structure is easily formed in the washing process of the noble metal catalyst layer during production. Further, a significant outflow of the noble metal catalyst or a significant collapse of the catalyst structure at the time of the washing process does not occur.

If the porosity of the second noble metal layer 12 is too high, performance of an electrochemical cell using the noble metal catalyst layer 10 are deteriorated. Thus, the porosity of the second noble metal layer 12 is specified to be 50 vol. % or less.

If the average thickness of the second noble metal layer 12 is too small, during the production of the noble metal catalyst layer 10 to be described later, the formation of the porous structure in the process of washing the noble metal catalyst layer becomes insufficient. In addition to this, the outflow of the noble metal catalyst increases. If the average thickness is too great, the ratio of the first noble metal layer 11 in the noble metal catalyst layer 10 decreases and a catalyst utilization efficiency of the whole noble metal catalyst layer 10 is decreased. In this case, the performance of an electrochemical cell using the noble metal catalyst layer 10 are deteriorated. Thus, the average thickness of the second noble metal layer 12 is set to a range of 3 to 20 nm. The thickness of the second noble metal layer 12 is preferably from 3 to 15 nm, more preferably from 3 to 10 nm.

When the second noble metal layer is not present, the amount of the porous part of the first noble metal layer 11 and the second noble metal layer in the noble metal catalyst layer 10 may be less than 60 vol. %. In the noble metal catalyst layer 10 of this embodiment, the amount of the porous part of the first noble metal layer 11 and the second noble metal layer in the noble metal catalyst layer 10 is preferably 60 vol. % or more. If the amount of the porous part becomes less than 60 vol. %, the volume of the cavity 13 having a width of 100 nm or more in the direction perpendicular to the thickness direction of the noble metal catalyst layer 10 present in the noble metal catalyst layer 10 is increased. A reactant produced by the electrochemical reaction is cross-leaked to the other side of the electrode and deterioration in performance may be caused.

The second noble metal layer 12 may be formed of two or more layers. The configuration of two or more layers allows the second noble metal layer 12 to be uniformly formed on the first noble metal layer 11 as compared with one formed of one layer.

The noble metal catalyst layer 10 of this embodiment may be one obtained by repeatedly laminating the first noble metal layer 11 and the second noble metal layer 12. Further, it may be one obtained by forming a laminated structure in which another material layer is formed on the second noble metal layer 12 formed on the first noble metal layer 11 and repeating the structure. Examples of the another material layer include layers having an effect of improving performance of the electrochemical cell, such as an effect of facilitating mass transfer in the catalyst layer (for example, a hydrophilic porous oxide layer).

The noble metal catalyst layer 10 can be formed by alternately laminating a plurality of the first noble metal layers 11 and a plurality of the second noble metal layers 12. In the case of such a configuration, a high total performance can be achieved according to durability, power generation performance, and robustness which are required for an electrochemical cell such as a fuel cell, by adjusting the thickness, porosity, and pore distribution of the first noble metal layers 11 and the second noble metal layers 12.

For example, when the layer is used as a fuel cell cathode, the interval between the adjacent second noble metal layers 12 is preferably 20 nm or more in order to ensure sufficient robustness. More preferably, the interval is 30 nm or more.

When the noble metal catalyst layer 10 is produced by alternately forming a plurality of the first noble metal layer 11 and a plurality of the second noble metal layer 12, the amount of the porous part of the first noble metal layer 11 and the second noble metal layer 12 in the noble metal catalyst layer 10 is preferably 60 vol. % or more. This can be achieved by limiting the interval between the first noble metal layer 11 and the second noble metal layer 12 or the thickness of the first noble metal layer.

The cavity in the porous body can store the fuel or the produced water in the fuel cell cathode. In the application for frequently occurring events such as load changes, the robustness may be improved by increasing the amount of the cavity. In order to prevent the outflow of the noble metal catalyst and the collapse of the catalyst structure at the time of the washing process and deterioration in performance, the porosity of the whole noble metal catalyst layer 10 is preferably 20 vol. % or more. The overall porosity of the noble metal catalyst layer 10 is more preferably 30 vol. % or more. The interval between the adjacent second noble metal layers 12 is preferably 500 nm or less, more preferably 400 nm or less.

In the case of the noble metal catalyst layer 10 produced by alternately forming a plurality of the first noble metal layers 11 and a plurality of the second noble metal layers 12, the porosity or pore distribution of each noble metal layer can be skewed. The skew direction may be either a direction perpendicular to the catalyst layer or a direction parallel to the catalyst layer. For example, the first noble metal layer 11 and the second noble metal layer 12 around the electrolyte membrane or around a fuel entrance are laminated more finely or at short intervals. Thus, performance of an electrolytic cell such as a fuel cell can be improved. Or, high performance can be obtained even with a smaller amount of noble metal.

The noble metal element as a catalyst material to be used for the noble metal catalyst layer 10 is, for example, at least one metal selected from the group consisting of noble metal elements, such as platinum (Pt), ruthenium (Ru), rhodium (Rh), osmium (Os), iridium (Ir), praseodymium (Pd), and gold (Au). These noble metal elements are excellent in catalytic activity, conductivity, and stability.

According to another example, the catalyst material to be used for the noble metal catalyst layer 10 may be a composite oxide or a mixed oxide containing an oxide of two or more metals selected from the above groups.

When the catalyst material to be used for the noble metal catalyst layer 10 is used for hydrogen oxidation reaction or hydrogen generation reaction, the catalyst material is formed from, for example, Pt.

When the noble metal catalyst layer 10 is used for oxidation reaction of a reformed hydrogen gas containing carbon monoxide (CO) or alcohol such as methanol and ethanol, the noble metal catalyst layer 10 is formed from, for example, an alloy having the composition represented by $Pt_yRu_zT_{1-y-z}$, where $0.2 \leq y \leq 0.8$, $0 \leq z \leq 0.8$, and element T is at least one element selected from the group consisting of W, Hf, Si, Mo, Ta, Ti, Zr, Ni, Co, Nb, V, Sn, Al, and Cr. In this case, the alloy contains 20 to 80 atomic % of Pt, 0 to 80 atomic % of Ru, and 0 to 80 atomic % of element T.

The catalyst material used for the oxygen reduction reaction is formed from, for example, an alloy having the composition represented by $Pt_uM_{1-u}$, where $0 \leq u \leq 0.9$, and element M is at least one element selected from the group consisting of Co, Ni, Fe, Mn, Ta, W, Hf, Si, Mo, Ti, Zr, Nb, V, Cr, Al, and Sn. In this case, the alloy contains 0 to 90 atomic % of Pt and 100 to 90 atomic % of element M.

When the noble metal catalyst layer 10 is used for the oxygen generation reaction, the catalyst material can be formed from, for example, an oxide of at least one metal selected from the group consisting of Ir, Ru, Pt, Au, Rh, and Os. Alternatively, the catalyst material may be formed from oxides of those metals and a composite oxide with an oxide of Ta or Sn.

Particularly, 30 atomic % or more of the noble metal element contained in the first noble metal layer 11 is preferably Pt or Ir. 30 atomic % or more of the noble metal element contained in the second noble metal layer 12 is preferably Pt or Ir. In this case, it is possible to provide a balance between the activity and durability of the catalyst material.

The noble metal catalyst layer 10 of this embodiment has a fine catalyst material and a suitable pore structure, and thus the effective area and utilization efficiency of the noble metal catalyst are very high.

The catalyst material of the first noble metal layer 11 and the second noble metal layer 12 is preferably Pt. The specific surface area of Pt in the noble metal catalyst layer, which is determined from the amount of hydrogen desorption obtained by cyclic voltammetry (CV), is preferably 25 $m^2/g$ or more.

In the method CV of this embodiment, a standard hydrogen electrode (RHE) is used as a reference electrode. The electrode is measured in a 0.1 M perchloric acid solution at 25° C. to obtain cyclic voltammograms. In the process of cleaning the catalyst surface before the present measurement, the potential of the reference electrode is ranged from 0.05 to 1.2 V and the sweep rate is 200 mV/s. The electrode is cycled several tens of times until a stable cyclic voltammogram is obtained. Thereafter, the sweep rate is set to 50 mV/s and the electrode is cycled five times.

The electrical quantity of hydrogen adsorption in the CV is defined as the electrical quantity in a maximum region from a double layer region to immediately before the initial potential for hydrogen generating current. The electrical quantity is converted to the electrochemical effective surface area using a value of 210 $mC/cm^2$. The initial potential for hydrogen adsorption and the initial potential for hydrogen generating current depend on the composition of the catalyst. When a main element of the noble metal catalyst is platinum, the initial potential for hydrogen adsorption is 0.1 V and the initial potential for hydrogen generating current is 0.4 V in many cases. Thus, in this embodiment, the specific surface area ($m^2/g$) of Pt is determined from the electrical quantity of hydrogen adsorption in a range of 0.1 to 0.4 V.

When the noble metal supporting density of the first noble metal layer 11 and the second noble metal layer 12 is 0.2 $mg/cm^2$ or less, the effect of this embodiment is particularly significantly exerted. A low level of the noble metal supporting density means that the noble metal catalyst layer is thin. When the noble metal catalyst layer is thick, it is more difficult to form a noble metal catalyst layer having a high specific surface area by a conventional method. When the noble metal supporting amount is 0.1 $mg/cm^2$ or less, the effect of this embodiment is more significantly exerted.

The effect of this embodiment is considered to be as follows.

A catalytic reaction takes place mainly on the surface of the catalyst layer. Accordingly, the utilization efficiency of the catalyst in the catalyst layer strongly depends on an effective reaction area of the catalyst. The noble metal catalyst layer 10 according to this embodiment has a specific surface area smaller than that of a conventionally-known particulate catalyst (for example, nano catalyst particles having a particle diameter of 2 nm to 5 nm), but has a mass activity higher than the particulate catalyst even when both the catalysts have the same catalyst composition. The reason is considered to be as follows. The catalyst activity strongly depends on a surface structure of the catalyst layer, and thus the noble metal catalyst layer 10 has a surface structure different from that of the conventional catalyst. It is considered that an amount of active sites with high activity on the surface of the noble metal catalyst layer 10 is larger than that of the conventional catalyst.

In this embodiment, the pore state of the first noble metal layer 11 and the second noble metal layer 12 is specified to a predetermined range so that a balance between the high utilization efficiency and high durability of the catalyst material can be achieved.

For example, in the electrode of the polymer electrolyte electrochemical cell, the utilization efficiency of the catalyst in a catalyst layer strongly depends on a density of a three-phase interface formed of a reactant, a catalyst, and a proton conductor. Hence, the catalyst layer is preferably made to be porous so as to have as many three-phase interfaces as possible. In the noble metal catalyst layer 10 of this embodiment, the presence of pores in the first noble metal layer 11 and the second noble metal layer 12 allows substances such as the reactant and the product to smoothly move, and allows an electrode reaction to effectively take place on the noble metal catalyst layer 10.

In the conventional production method, a lot of pores can be formed while the noble metal catalyst is refined. However, the outflow of the noble metal catalyst and the collapse of the catalyst layer structure are caused in the washing process. The phenomenon becomes significant, particularly when the amount of the noble metal catalyst is low. The pore structure of the catalyst layer is not optimized because the pore structure of the catalyst layer is deteriorated. In order to greatly reduce the amount of the noble metal catalyst, there has been a need for the development of a novel production process or a novel catalyst layer.

In this embodiment, the refinement of the noble metal catalyst and the optimization of the catalyst layer pore structure allow the outflow of the noble metal catalyst and the collapse of the catalyst layer structure in the washing process to be prevented. As a result, a catalyst layer having an optimal pore structure is produced and high performance are obtained.

Hereinafter, a method for producing a noble metal catalyst layer having second noble metal layers on both sides of the first noble metal layer will be described.

The each layer is produced by sputtering or vapor deposition.

First, a second noble metal layer precursor formed of a mixture of a noble metal element (catalyst material) and a porogen is formed on a substrate.

Subsequently, a first noble metal layer precursor formed of a mixture of a noble metal element (catalyst material) and a porogen is formed on the second noble metal layer precursor.

Thereafter, the second noble metal layer precursor formed of a mixture of a noble metal element (catalyst material) and a porogen is formed on the first noble metal layer precursor.

In sputtering or vapor-deposition, the catalyst material containing the noble metal element and the porogen can be simultaneously formed by sputtering targets of the respective materials. Alternatively, a target formed by mixing the catalyst material with the porogen may be used. It is desirable to form the second noble metal layer precursor on the side where the outflow of the catalyst material is likely caused in the washing process to be described later, such as the opposite side of the substrate side of the first noble metal layer.

The thickness of the second noble metal layer precursor is preferably within a range of 3 to 20 nm. The second noble metal layer precursor is important for the formation of the noble metal catalyst layer of this embodiment. The formation of a second noble metal layer having a low porosity allows a porous structure to be easily formed by the washing process to be described later.

If the thickness of the second noble metal layer precursor is too small, it is impossible to sufficiently form a porous structure and suppress the outflow of the catalyst material even when the washing process to be described later is performed. When the thickness is too great, the volume of the second noble metal porous layer having a high porosity is reduced. As a result, the catalyst utilization efficiency of the whole noble metal catalyst layer is decreased and performance when it is used as an electrochemical cell is reduced. The thickness of the second noble metal layer precursor is more preferably from 3 to 15 nm, particularly preferably from 3 to 10 nm.

The volume (volume ratio) of the second noble metal layer precursor to the total volume of the first noble metal layer and the second noble metal layer is preferably 60% or less. When the volume ratio of the second noble metal layer precursor is too high, it becomes difficult to uniformly form a first noble metal layer having a high porosity. Thus, performance when it is used as an electrochemical cell is reduced. If the second noble metal layer is not present, even when the catalyst layer is subjected to the washing process, the porous structure of the noble metal catalyst layer of this embodiment is difficult to be formed. This results in a significant outflow of the catalyst material or a significant collapse of the catalyst layer structure.

The amount (volume ratio) of the porogen in the first noble metal layer precursor is preferably from 65 to 95%. If the volume ratio of the porogen in the first noble metal layer is too low, a sufficient amount of pores cannot be formed. In this case, the utilization efficiency of the catalyst is bad and it is difficult to greatly reduce the amount of the noble metal element. If the volume ratio is too high, it is difficult to form a uniform porous structure of the catalyst layer in the washing process, which results in a significant outflow of the catalyst material. As a result, the performance when it is used as an electrochemical cell is reduced.

The porogen to be used is one whose solubility in a washing solution being used in the pore-forming process is higher than that of a catalyst material containing a noble metal element. In the pore-forming process, the porogen is removed by acid or alkali washing to be described later. Examples of the porogen include metals or metal oxides. From the viewpoints of capable of forming and removing in a short time, workability, and cost, metals are preferred.

As the metal used as the porogen, at least one metal selected from the group consisting of manganese (Mn), iron (Fe), cobalt (Co), nickel (Ni), zinc (Zn), tin (Sn), aluminum (Al), and copper (Cu) is preferred. Further, particles of ceramic, such as oxides and nitrides, can be used. In the following description, the porogen will be described as a pore-forming metal.

In sputtering or vapor deposition, the structure and stability of oxides can be adjusted by introducing oxygen into the atmosphere. In this case, it is preferable to set the oxygen partial pressure in the atmosphere to less than 20%. In the process of removing the pore-forming metal from each of the noble metal porous layer precursors to be described later, the whole pore-forming metal may not be removed in some cases. Accordingly, the amount of the pore-forming metal in the catalyst layer precursor may be set to a value higher than a desired porosity.

As the substrate, a carbon sheet, a Teflon sheet ("Teflon" is a trademark of Du Pont) or the like is used.

Subsequently, the pore-forming metal is dissolved by, for example, a washing process and/or an electrolytic process to allow it to be removed from each of the noble metal layer precursors. The process is referred to as "pore-forming process". In the washing, for example, an acidic or alkaline solution can be used. Thus, a porous catalyst layer is obtained.

For example, when the acidic solution is used as the washing solution, the catalyst layer precursor is immersed in, for example, nitric acid, hydrochloric acid, sulfuric acid or a mixed liquid thereof for about 5 minutes to 50 hours. In this case, the acidic solution may be heated to about 50 to 100° C. Further, a bias voltage may be applied to facilitate the dissolution of the pore-forming metal. Further, the heat treatment may be performed after these processes.

The catalyst material containing a noble metal element is eluted along with the dissolution of the pore-forming metal. In order to suppress this phenomenon, a process of fixing a noble metal layer precursor on a substrate may be previously performed in advance. For example, the catalyst layer precursor is impregnated with a polymer solution such as Nafion (trade name, manufactured by Du Pont) and dried, followed by dissolving of the pore-forming metal. In accordance with the catalyst composition and the use specification of the electrochemical cell, the concentration of the washing solution and the heating temperature can be adjusted.

The pore structure of the noble metal catalyst layer can be adjusted by heat-treating the noble metal catalyst layer precursor before the washing process. Alternatively, after the washing process, the noble metal catalyst layer may be heat-treated to adjust the pore structure of the noble metal catalyst layer, the catalyst structure, and the surface state. The performance of the electrochemical cell can be further improved by performing the heat treatment before and after the washing process. The heat treatment is preferably performed at about 50 to 900° C. for about 1 to 50 hours. The atmosphere is not particularly limited and it may be argon, nitrogen, hydrogen or a mixed gas thereof. In some cases, the performance may be improved by introducing a small amount of oxygen.

A polymer solution such as Nafion (manufactured by Du Pont) may be applied to the obtained noble metal catalyst layer by spraying or impregnation. Thus, the proton conductivity of the noble metal catalyst layer and the adhesion property with other members can be improved. In the case of the fuel cell, a water repellent may be introduced by vacuum deposition or impregnation in order to suppress the performance degradation due to the water flooding.

Since the carbon material is hydrophobic, the carbon material is introduced into the obtained noble metal catalyst layer to suppress the water flooding. As a result, the performance of the electrochemical cell can be improved.

The shape and structure of the carbon material is not particularly limited. Examples thereof may include carbon nanofibers, carbon nanotubes, carbon black, and a mixture thereof. The method for introducing the carbon material is not also particularly limited. For example, a synthetic catalyst of a carbon material such as Ni, Fe, or Co is introduced into the noble metal catalyst layer. The resulting layer is subjected to heat treatment at 200 to 900° C. in an atmosphere of a gas containing carbon such as $C_2H_4$ or $CH_4$ so that a nano-sized carbon material can be synthesized in the noble metal catalyst layer. The orientation of the synthesized carbon material can be controlled by applying a voltage bias by the thermal CVD method.

A part of the pore-forming metal may remain in the obtained noble metal catalyst layer. It is considered that the remaining pore-forming metal forms a stable oxide and contributes to the growth suppression of the catalyst material, maintenance of the structure of the noble metal catalyst layer, and facilitation of proton conduction.

The outflow of the noble metal element and the collapse of the noble metal catalyst layer at the time of washing are dependent on the thickness of the noble metal catalyst layer and the noble metal supporting density. Thus, the effect of the production method according to this embodiment is the highest when the noble metal supporting density is 0.2 $mg/cm^2$ or less.

Figure 2:
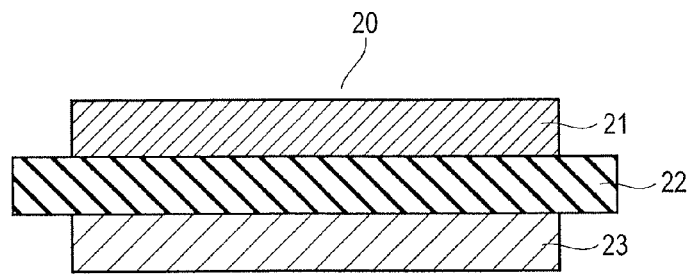
FIG. 2 is a cross-sectional view schematically showing a membrane electrode assembly (MEA) according to one embodiment.

FIG. 2 is a cross-sectional view schematically showing an MEA according to one embodiment.

An MEA 20 includes a first electrode 21, a second electrode 23, and an electrolyte membrane 22 sandwiched between the first electrode and the second electrode.

At least one of the first electrode 21 and the second electrode 23 includes the catalyst layer. The first electrode 21 and the second electrode 23 are, for example, an anode and a cathode, respectively.

When the MEA 20 is used in the fuel cell, hydrogen is supplied to the first electrode (anode) and oxygen is supplied to the second electrode 23 (cathode). Both the anode and the cathode may further include a fuel diffusion layer.

The fuel diffusion layer preferably contains a water repellent. The water repellent improves, for example, the water repellency of the fuel diffusion layer and avoids the so-called flooding phenomenon in which water generated by power generation is not discharged from the inside of a laminar catalyst layer, resulting in water remaining. Usable examples of the water repellent include fluorinated polymer materials selected from polytetrafluoroethylene (PTFE), polyvinylidene fluoride (PVDF), polyhexafluoropropylene and tetrafluoroethylene hexafluoropropylene copolymer (FEP). The water repellent is introduced into the fuel diffusion layer after forming the catalyst layer.

The electrolyte membrane 22 contains, for example, a polyelectrolyte. The electrolyte 22 further contains a proton conductive substance and conducts hydrogen ions derived from the hydrogen supplied to the anode 21. Usable examples of the proton conductive substance include fluororesins having a sulfonic acid group such as Nafion (trade name, manufactured by Du Pont), Flemion (trade name, manufactured by Asahi Kasei Corporation), and Aciplex (trade name, manufactured by Asahi Glass Co., Ltd.); and inorganic substances such as tungstic acid and tungstophosphoric acid.

The thickness of the electrolyte membrane 22 can be appropriately determined taking into consideration the performance of the MEA 20 to be obtained. The thickness of the electrolyte membrane 22 is preferably from 5 to 300 μm, more preferably from 10 to 150 μm from the viewpoint of strength, performance, and output performance of the MEA 20.

The MEA according to one embodiment is produced by the following procedure.

First, the noble metal catalyst layer according to the embodiment is transferred to the fuel diffusion layer or the electrolyte membrane 22 to form an electrode. When the noble metal catalyst layer is directly formed on the fuel diffusion layer or the electrolyte membrane 22, a catalyst layer having a large ratio R1 may not be obtained.

In order to suppress the performance degradation due to the water flooding, different types of noble metal catalyst layers in the electrode may be combined. For example, the noble metal catalyst layer of this embodiment is combined with a catalyst layer formed of carbon-supported platinum particles. The combined layer is transferred to the electrolyte membrane to form an electrode.

Subsequently, the electrolyte membrane 22 is sandwiched between the obtained first electrode 21 and the second electrode 23, which is joined by heating and applying pressure to obtain an MEA.

The electrolyte membrane 22 is generally joined to each electrode using a hot-press machine. The press temperature is a temperature higher than the glass transition temperature of the polymer electrolyte which is used as a binder in the electrode and the electrolyte membrane 22. Generally, it is from 100 to 400° C. The press pressure depends on the hardness of the electrode to be used and is generally from 5 to 200 kg/cm².

As for the MEA according to this embodiment, the catalyst layer contained in the electrode has high performance.

The MEA of the embodiment can be used for the electrochemical cell.

As an example of the electrochemical cell, the fuel cell includes the MEA of the embodiment, a unit configured to supply a fuel to the anode, and a unit configured to supply an oxidant to the cathode. In addition to the membrane electrode assembly, a fuel cell channel plate is provided, and a porous fuel diffusion layer may further be provided between the membrane electrode assembly and the fuel cell channel plate.

Figure 3:
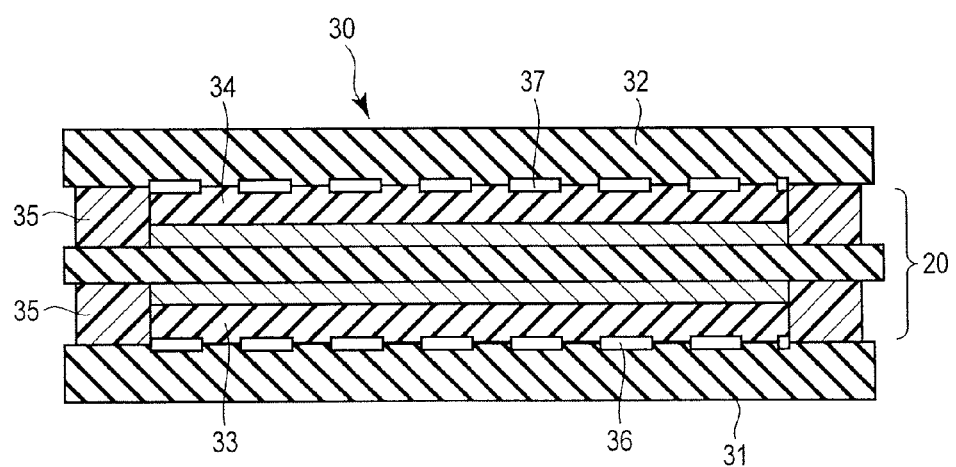
FIG. 3 is a cross-sectional view schematically showing a fuel cell according to one embodiment.

FIG. 3 is a cross-sectional view schematically showing a fuel cell according to one embodiment.

In the fuel cell 30, the MEA 20 is incorporated into an anode holder 31 and a cathode holder 32 to configure a unit cell. Then, electricity is generated. Between the MEA 20 and the anode holder 31, anode diffusion layer 33 is disposed. Between the MEA 20 and the cathode holder 32, cathode diffusion layer 34 is disposed. Sides of the fuel cell are sealed with gasket 35. The anode holder 31 has a fuel supply groove 36 for supplying hydrogen or the like as a fuel to an anode. The cathode holder 32 has an oxidant-gas supply groove 37 for supplying air (oxygen) from a supplying body for supplying an oxidant such as air or oxygen to a cathode.

The number of MEAs to be used may be one or more. The use of a plurality of the MEAs allows a higher electromotive force to be generated. For example, a stack structure or a plane arrangement structure may be formed, in which the MEAs are laminated to be connected in series between the cathode holder and the anode holder. The shape or the like of the fuel cell is not particularly limited, and may be determined appropriately such that a desired cell performance such as voltage can be obtained.

As the fuel to be used for this fuel cell, an aqueous solution can be used in addition to hydrogen and a reformed gas. The aqueous solution contains at least one selected from the group consisting of methanol, ethanol, and formic acid.

The electrochemical cell has been described giving an example of the fuel cell, but the example can be employed also for another electrochemical cell, for example, an electrolytic cell as an electrochemical cell. For example, the electrochemical cell can be an electrolytic cell when the electrochemical cell has a configuration where the anode of the fuel cell has been replaced with an oxygen generation catalyst electrode. For example, the electrolytic cell includes the oxygen generation catalyst electrode as the first electrode 21, in place of the anode. The laminar catalyst layer according to this embodiment is useful for a micro-electromechanical systems (MEMS) electrochemical cell.

Since the electrochemical cell includes an MEA which includes a noble metal catalyst layer having high catalytic activity and durability, its long-term stability is high.

Hereinafter, the embodiments will be more specifically described with reference to Examples and Comparative examples.

Production of Catalyst Layer

Examples 1 to 10

A piece of carbon paper (manufactured by SGL Group—The Carbon Company) was used as a substrate. The catalyst material and the porogen (pore-forming metal) shown in Table 1 below were formed on the substrate by sputtering targets of the respective materials. Thus, a second noble metal layer A precursor, a second noble metal layer A precursor, and a second noble metal layer B precursor were formed to obtain a noble metal catalyst layer precursor.

In the sputtering process, in each example shown in Table 1 below, sputtering parameters of the catalyst material and the pore-forming metal were adjusted so that the thickness of the second noble metal layer A, the porosity of the second noble metal layer A, the porosity of the first noble metal layer, the volume of pores having a diameter of 5 to 80 nm in the first noble metal layer, the thickness of the second noble metal layer B, and the porosity of the second noble metal layer B were set to values shown in Table 1 and the platinum loading amount was 0.08 mg/cm².

For example, in the case of Example 1, a platinum loading amount of 0.08 mg/cm² corresponds to a Pt film thickness of about 38 nm. Thus, when the second noble metal layer A and the second noble metal layer B were formed to have a Pt thickness of 4 nm, the sputtering parameters were adjusted so that the amount of platinum contained in the first noble metal layer corresponded to a thickness of 30 nm.

Subsequently, the obtained noble metal catalyst layer precursor was subjected three times to an acid treatment of immersing in 10% by weight of a sulfuric acid solution at 80° C. for 15 minutes. Thereafter, the resulting product was washed with pure water and dried. Thus, the noble metal catalyst layers of Examples 1 to 10 were obtained.

In Examples 1 to 10, it is confirmed that the amount of the porogen in the second noble metal layer precursor, is 60% or less, and the amount of the porogen in the first noble metal layer precursor is from 65 to 95%.

The volume ratio of the porogen is defined as follows:

Volume ratio of porogen=volume of porogen/(volume of catalyst material+volume of porogen)

As for the volumes of the catalyst material and the porogen, the volumes were calculated from the thickness of the membrane obtained by using targets of the respective materials under film formation conditions when forming the catalyst layer.

Comparative Example 1

A single catalyst layer was formed on a whisker substrate (organic pigment red 149, average diameter: about 50 nm) by sputtering Pt as the catalyst material. In this case, the catalyst layer was formed so that the loading amount was 0.08 mg/cm².

Comparative Example 2

The same substrate as Examples 1 to 10 was prepared. An alloy having a composition of $Pt_4Mn_6$ (as the catalyst materials) and Mn were alternately formed on the substrate to obtain a laminated structure. In this case, five layers of alloy and four layers of the pore-forming metal (thickness of porogen layer: 30 nm) were formed. In this case, the respective layers were formed so that the total loading amount of the catalyst was 0.08 mg/cm².

Subsequently, similarly to Examples 1 to 10, the process of dissolving the pore-forming metal and the process of Du Pont), and 20 g of 2-ethoxyethanol were sufficiently stirred and dispersed to prepare a slurry. The obtained slurry was applied to the carbon paper used in Examples 1 to 10 with a control coater and dried to produce a Pt-standard electrode having a Pt-catalyst loading density of 0.08 mg/cm².

TABLE 1

| | Catalyst material | Porogen | Second noble metal layer A thickness (nm) | Second noble metal layer A porosity (vol. %) | First noble metal layer A porosity (vol. %) | Pore size distribution (%) | Second noble metal layer B thickness (nm) | Second noble metal layer B porosity (vol. %) |
|---|---|---|---|---|---|---|---|---|
| Example 1 | Pt | Al | 4.0 | 0.0 | 90 | 80 | 4.0 | 0.0 |
| Example 2 | PtNi | Al | — | — | 85 | 70 | 5.0 | 0.0 |
| Example 3 | PtCo | Al | 5.0 | 50 | 75 | 60 | 5.0 | 50 |
| Example 4 | Pt | Fe | 5.0 | 30 | 65 | 50 | 5.0 | 30 |
| Example 5 | Pt | Fe | 3.0 | 0.0 | 90 | 80 | 3.0 | 0.0 |
| Example 6 | PtNbTa | Mn | 5.0 | 0.0 | 75 | 60 | 5.0 | 0.0 |
| Example 7 | $Pt_8W_2$ | Mn | 5.0 | 0.0 | 85 | 55 | 5.0 | 0.0 |
| Example 8 | Pt | Al | 3.0 | 0.0 | 90 | 60 | 3.0 | 0.0 |
| Example 9 | Pt | Al | 3.0 | 50.0 | 90 | 80 | 3.0 | 50.0 |
| Example 10 | Pt | Al | 3.0 | 20.0 | 90 | 50 | 3.0 | 20.0 |
| Comparative Example 1 | Pt (whisker substrate) | — | None | — | — | No pores | None | — |
| Comparative Example 2 | $Pt_4Mn_6$ (lamination) | Mn | None | — | 40 | 30 | None | — |
| Comparative Example 3 | Pt | Al | None | — | 90 | 80 | None | — |
| Comparative Example 4 | Pt | Al | 2.0 | 0.0 | 90 | 80 | 2.0 | 0.0 |
| Comparative Example 5 | Pt | Al | 5.0 | 60 | 90 | 80 | 5.0 | 60 |
| Comparative Example 6 | Pt | Al | 21.0 | 60 | 90 | 80 | 21.0 | 60 | washing and drying the catalyst layer were performed to obtain a catalyst layer having a laminated structure.

Comparative Examples 3 to 6

The same substrate as Examples 1 to 10 was prepared. Sputtering parameters of the catalyst material and the pore-forming metal on the substrate were adjusted so that the catalyst materials and the porogens shown in Table 1 were values shown in Table 1 and the catalyst loading amount was 0.08 mg/cm².

Subsequently, similarly to Examples 1 to 10, the process of dissolving the pore-forming metal and the process of washing and drying the catalyst layer were performed to obtain a catalyst layer.

The catalyst layer obtained in the examples and the comparative examples were evaluated according to the following procedure.

<Production of Electrode>

An electrode was produced using each of the catalyst layers obtained in these examples and comparative examples by the following procedure.

In the catalyst layers of Examples 1 to 10 and Comparative examples 2 to 6, a porous diffusion layer substrate was used as a substrate. Thus, the catalyst layer formed on the substrate was used as the electrode as it is formed. The catalyst layer of Comparative example 1 on the substrate was thermally compression bound to the carbon paper used in Examples 1 to 10 at 150° C. under a pressure of 20 kg/cm² for 3 minutes and transferred to form an electrode.

(Pt-Standard Electrode)

2 g of a commercially available Pt catalyst (manufactured by Tanaka Kikinzoku Kogyo Co. Ltd.), 5 g of pure water, 5 g of a 20% solution of Nafion (trade name, manufactured by <Production of MEA>

A square of 5 cm×5 cm was cut out from each of the electrodes in Examples 1 to 10 and Comparative examples 1 to 6. The slice was used as the cathode as the second electrode 23 of the MEA shown in FIG. 2. The catalyst layer of Comparative example 2 was directly used as the cathode as the second electrode 23.

As the anode as the first electrode 21, the Pt-standard electrode was used.

Nafion 112 (trade name, manufactured by Du Pont) as the electrolyte membrane 22 was sandwiched between the first electrode 21 and the second electrode 23. The sandwiched therebetween was subjected to thermal compression binding at 125° C. under a pressure of 30 kg/cm² for 5 minutes to produce an MEA.

<Production of Single Cell of Fuel Cell>

The obtained MEA was sandwiched between a first separator and a second separator each having a flow channel, and a single cell of a polyelectrolyte type fuel cell was produced as the electrochemical cell.

The catalyst layers of Examples 1 to 10 and Comparative examples 1 to 6, the MEA, and the single cell were evaluated on the following items.

1. Pore Size, Pore Size Distribution, and Porosity

In Examples 1 to 10 and Comparative examples 1 to 7, the catalyst layer or the electrode was cut (for example, a central position when a plane shape was rectangular). The central position of the cut surface was observed with the SEM (100,000-times magnification). A continuous layer of noble metal having a length of 50 nm or more and a width of 2 nm or more present on the catalyst layer surface, as seen in a cross-section photograph, was defined as the second noble metal layer.

From the SEM images obtained, it was confirmed that Examples 1 to 10 had a structure having a fine second noble metal layer on the surface of the first noble metal layer having a high porosity. It was observed that the first noble metal layer included the noble metal porous body and the cavity having a size of 100 nm or more. It was also confirmed that the catalyst layer of Comparative example 1 was a fine layer structure, and the catalyst layer of Comparative example 2 had a laminated structure obtained by alternately laminating the catalyst layers containing pores and gap layers.

Each of the catalyst layers or the standard electrode was cut at the upper, central, and lower parts along a thickness direction. The cut sections at three points were observed with the SEM (200,000-times magnification).

SEM images (total 9 fields) were obtained. The width of a continuous noble metal layer having a length of 50 nm or more and a width of 2 nm or more present on the catalyst layer surface was defined as the thickness of the second noble metal layer. The average of 9 fields of vision was defined as the thickness of the second noble metal layer.

The second noble metal layer and the first noble metal layer in each field of vision were distinguished by the contrast. Further, the catalyst material and pores in each layer were distinguished. An area (S11) occupied by the catalyst material in the first noble metal layer, a whole pore area (S12), an area (S13) occupied by pores distributed in a pore size range of 3 to 80 nm, an area (S21) occupied by the catalyst material in the second noble metal layer, a whole pore area (S22), and an area (S23) occupied by pores distributed in a pore size range of 3 to 80 nm were calculated.

Based on these areas, a proportion of the area occupied by pores distributed in a pore size range of 3 to 80 nm ((S13+S23)/(S12+S22)) in each field of vision was calculated. An average of 9 fields of vision was defined as the pore size distribution proportion. As the porosity of the first noble metal layer or the second noble metal layer, the proportion (S12/(S11+S12)) and the proportion (S22/(S21+S22)) in each field of vision were calculated. An average of 9 fields of vision was defined as the porosity of the first noble metal layer or the second noble metal layer.

In Comparative example 2 having the laminated structure, the gap layer between the catalyst layers is not included in the pores. In Examples 1 to 10 and Comparative examples 3 to 6, the cavity having a size of 100 nm or more is not included in the pores.

The porosity of the catalyst layer is a proportion of the total area of an area occupied by the pores and an area (S3) occupied by the cavity ((S12+S22+S3)/(S11+S12+S21+S22+S3)).

MEAs produced from the electrodes were subjected to SEM observation. It was observed that both sides of the catalyst layers were adjacent to the porous substrate and the electrolyte membrane, and the catalyst layers of Examples 1 to 10 and Comparative examples 4 to 6 included the noble metal porous body and the cavity having a size of 100 nm or more.

Each of the catalyst layers was cut at the upper, central, and lower parts along a thickness direction. Further, the cut sections at three points were observed with the SEM.

100,000-times-magnification SEM images (total 9 fields) were obtained, and the noble metal porous body and the cavity were distinguished by the contrast. Then, a whole catalyst layer area (S0) in each field of vision, an area (S1) occupied by the first noble metal porous body, an area (S2) occupied by the second noble metal layer were calculated. Based on these areas, a volume ratio of the first noble metal layer (S1/S0), a volume ratio of the second noble metal layer (S2/S0), and a volume ratio of the noble metal porous body ((S1+S2)/S0) in each field of vision were calculated. An average of 9 fields of vision was defined as the volume ratio of the first noble metal layer, the volume ratio of the second noble metal layer or the volume ratio of the noble metal porous body.

As for the noble metal catalyst layer produced by alternately forming a plurality of the first noble metal layer and a plurality of the second noble metal layer, SEM images (total 9 fields) were obtained. The second noble metal layer and the first noble metal layer in each field of vision were distinguished by the contrast. The interval between the second noble metal layer and the adjacent second noble metal layer was measured. An average interval in each field of vision was calculated, and an average of 9 fields of vision was defined as a gap between the adjacent second noble metal layers.

2. Cell Voltage

Hydrogen as a fuel was supplied to the anode as the first electrode 21 in the single cell to be obtained at a flow rate of 200 ml/min under a pressure of 100 kPa, air was supplied to the cathode 23 as the second electrode 23 at a flow rate of 500 ml/min under a pressure of 150 kPa. The cell was discharged at a current density of 1 A/cm$^2$ to measure the cell voltage (V) after 50 hours. In this case, the single cell was maintained at 70° C.

3. Durability

The durability was evaluated according to the following start/stop durability test. The single cell was maintained at 70° C. while hydrogen was supplied to the anode 21 as the first electrode 21 at a flow rate of 100 ml/min and nitrogen was supplied to the cathode as the first electrode 23 at a flow rate of 100 ml/min. In that condition, in the process of washing the catalyst surface, the potential was ranged from 0.05 to 1.2 V and the sweep rate was 200 mV/s. The electrode was cycled several tens of times until a stable cyclic voltammogram was obtained.

Then, the sweep rate was set to 50 mV/s and the electrode was cycled five times. The electrical quantity of hydrogen adsorption in the CV was defined as the electrical quantity in a maximum region from a double layer region to immediately before the initial potential for hydrogen generating current. The electrical quantity was converted to the electrochemical effective surface area using a value of 210 mC/cm$^{-2}$ to calculate an initial Pt mass/surface area E0 (m$^2$/g).

Thereafter, the triangular wave at a frequency of 2 seconds per cycle (cell voltage: 1.0 to 1.5 V) was repeated 30,000 times in total. Then, the electrical quantity of hydrogen adsorption was measured by the CV. A Pt mass surface area E1 was determined. The reduction ratio was determined by comparing the Pt mass surface area E1 with the initial Pt mass/surface area E0. The durability is evaluated as "very good" when the reduction ratio is within 10%. The durability is evaluated as "good" when the reduction ratio is in a range of 10 to 25%. The durability is evaluated as "poor" when the reduction ratio is 25% or more.

The results obtained as to the cell voltage and durability are shown in Table 2 below.

TABLE 2

|  | Cell voltage | Durability |
| --- | --- | --- |
| Example 1 | 0.71 | ◯ |
| Example 2 | 0.70 | ◯ |
| Example 3 | 0.71 | ◯ |
| Example 4 | 0.70 | ◯ |
| Example 5 | 0.70 | ◯ |
| Example 6 | 0.69 | ◉ |

TABLE 2-continued

|  | Cell voltage | Durability |
|---|---|---|
| Example 7 | 0.71 | ○ |
| Example 8 | 0.69 | ◎ |
| Example 9 | 0.71 | ○ |
| Example 10 | 0.70 | ◎ |
| Comparative Example 1 | 0.66 | ○ |
| Comparative Example 2 | 0.68 | ○ |
| Comparative Example 3 | 0.63 | ○ |
| Comparative Example 4 | 0.65 | ○ |
| Comparative Example 5 | 0.65 | ○ |
| Comparative Example 6 | 0.50 | ◎ |

The single cells with the catalyst layers of Examples 1 to 10 have a high cell voltage and are good in durability. The volume of the pore size distribution in a range of 5 to 80 nm is 50% by volume or more. It is confirmed that the volume ratio of the porous part in the catalyst layer is 60% or more, and the specific surface area of platinum in the noble metal catalyst layer, which is determined from the amount of hydrogen desorption obtained by the cyclic voltammetry, is 25 $m^2/g$ or more.

As is clear from Table 1, when Examples 1 to 10 are used for the single cell of the fuel cell, a high cell voltage and high durability are obtained as compared with Comparative examples 1 to 6. As for Comparative examples 1, 2, and 6, it is considered that a sufficient platinum specific surface area is not obtained. The reason, in the case of Comparative example 3, is that the catalyst layer having a high porosity is not uniformly formed inside of the catalyst layer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A noble metal catalyst layer comprising:
a first noble metal layer which comprises a first noble metal element and a cavity having a diameter of 100 nm or more, the first noble metal layer excluding the cavity having a porosity of 65 to 95 vol. %, a volume of pores having a diameter of 5 to 80 nm accounting for 50% or more of a volume of the total pores excluding the cavity in the first noble metal layer; and
second noble metal layers which are formed on both sides of the first noble metal layer, comprise a second noble metal element and have an average thickness of 3 to 20 nm and a porosity of 50 vol. % or less,
wherein the noble metal catalyst layer has an overall porosity of 20 vol. % or more, and an amount of a porous part of the first noble metal layer and the second noble metal layers in the noble metal catalyst layer is 60 vol. % or more.

2. The noble metal catalyst layer according to claim 1, wherein the porosity of the first noble metal layer is from 75 to 95 vol. %.

3. The noble metal catalyst layer according to claim 2, wherein the porosity of the first noble metal layer is from 80 to 95 vol. %.

4. The noble metal catalyst layer according to claim 1, wherein, in the first noble metal layer, the volume of pores having a diameter of 5 to 80 nm is 70% or more of the volume of the total pores in the first noble metal layer.

5. The noble metal catalyst layer according to claim 1, wherein the average thickness of each of the second noble metal layer is from 3 to 15 nm.

6. The noble metal catalyst layer according to claim 5, wherein the average thickness of each of the second noble metal layer is from 3 to 5 nm.

7. The noble metal catalyst layer according to claim 1, wherein each of the second noble metal layers is formed of two or more layers.

8. The noble metal catalyst layer according to claim 1, wherein, in the first noble metal layer, a volume of pores having a diameter of 30 nm or more accounting for 30% or more of the volume of the total pores in the first noble metal layer.

9. The noble metal catalyst layer according to claim 8, wherein, in the first noble metal layer, the volume of pores having a diameter of 30 nm or more accounting for 40% or more of the volume of the total pores in the first noble metal layer.

10. The noble metal catalyst layer according to claim 9, wherein, in the first noble metal layer, the volume of pores having a diameter of 30 nm or more accounting for 50% or more of the volume of the total pores in the first noble metal layer.

11. The noble metal catalyst layer according to claim 1, wherein the overall porosity is 30 vol. % or more.

12. The noble metal catalyst layer according to claim 1, wherein the noble metal catalyst layer comprises a noble metal element at a supporting density of 0.2 $mg/cm^2$ or less, the noble metal element comprising the first noble metal element and the second noble metal element.

13. The noble metal catalyst layer according to claim 12, wherein the supporting density is 0.1 $mg/cm^2$ or less.

14. The noble metal catalyst layer according to claim 1, wherein interval between the second noble metal layers is 500 nm or less.

15. The noble metal catalyst layer according to claim 14, wherein the interval between the second noble metal layers is 400 nm or less.

16. The noble metal catalyst layer according to claim 1, wherein 30 atomic % or more of the first noble metal element is platinum or iridium, and 30 atomic % or more of the second noble metal element is platinum or iridium.

17. The noble metal catalyst layer according to claim 1, wherein the first noble metal element and the second noble metal element is platinum, and a specific surface area of platinum in the noble metal catalyst layer, which is determined from the amount of hydrogen desorption obtained by cyclic voltammetry, is 25 $m^2/g$ or more.

18. A membrane electrode assembly comprising:
a first electrode;
a second electrode; and
an electrolyte membrane sandwiched between the first electrode and the second electrode, at least one of the first electrode and the second electrode comprising a noble metal catalyst layer of claim 1.

* * * * *

UNITED STATES PATENT AND TRADEMARK OFFICE
CERTIFICATE OF CORRECTION

PATENT NO. : 9,865,882 B2
APPLICATION NO. : 13/850478
DATED : January 9, 2018
INVENTOR(S) : Mei et al.

Page 1 of 1

It is certified that error appears in the above-identified patent and that said Letters Patent is hereby corrected as shown below:

In the Claims

Claim 14, Column 18, Line 44, change "wherein interval between" to --wherein the interval between--.

Signed and Sealed this
Third Day of April, 2018

Andrei Iancu
*Director of the United States Patent and Trademark Office*